United States Patent Office 3,414,564
Patented Dec. 3, 1968

3,414,564
PROCESS FOR THE PRODUCTION OF
17-ETHYLIDENE STEROIDS
Alan Martin Krubiner, Cedar Grove, and Eugene Paul
Oliveto, Glen Ridge, N.J., assignors to Hoffmann-La
Roche Inc., Nutley, N.J., a corporation of New Jersey
No Drawing. Filed Mar. 3, 1966, Ser. No. 531,346
15 Claims. (Cl. 260—239.5)

ABSTRACT OF THE DISCLOSURE

A process for the preparation of 17-ethylidene steroids or 17-ethylidene-desA-steroids is described which comprises reacting 17-oxo-steroids of the androstane series or of the desA-androstane series with a compound of the formula

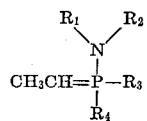

wherein each of $R_1$ and $R_2$ is independently lower alkyl or phenyl-lower alkyl or $R_1$ and $R_2$ taken together are oxa-lower alkylene or lower alkylene; and each of $R_3$ and $R_4$ is independently a moiety of the formula

phenyl or substituted phenyl. The compounds produced by this process are useful as intermediates in the preparation of known pregnano steroids.

---

This invention relates to a novel process useful in the preparation of 17-ethylidene-steroids.

In recent years much effort has been devoted to the synthesis of steroids. Several syntheses have been developed which lead to a steroid containing a 17-oxo moiety. Various of these syntheses proceed through an intermediate desA-steroid containing a 17-oxo moiety, prior to formation of the tetracyclic steroid moiety. Methods are known in the art for converting 17-ethylidene-steroids or 17-ethylidene-desA-steroids to pharmacologically valuable 17β-pregnanes. However, the prior art methods for preparing 17-ethylidene-steroids or desA-steroids suffer due to low yields, costly reagents, difficult to handle materials, multiplicity of steps, complexity of isolation of products, etc.

The present invention comprehends a process for converting a 17-oxo-steroid of the androstane series or a 17-oxo-desA-steroid of the androstane series into a 17-ethylidene-steroid or 17-ethylidene-desA-steroid, respectively. The so-obtained 17-ethylidene compounds can be converted into 17β-acetyl compounds by methods which are not a part of this invention, but which will be described hereinbelow in order that this disclosure may be complete. The process of this invention gives high yields and is easily manageable. Moreover, a particular advantage of the proccess of this invention is the facile manner in which the desired 17-ethylidene end product can be isolated from the reaction mixture. The process of this invention is illustrated by the following structural formulas, details being shown only for the 17-position.

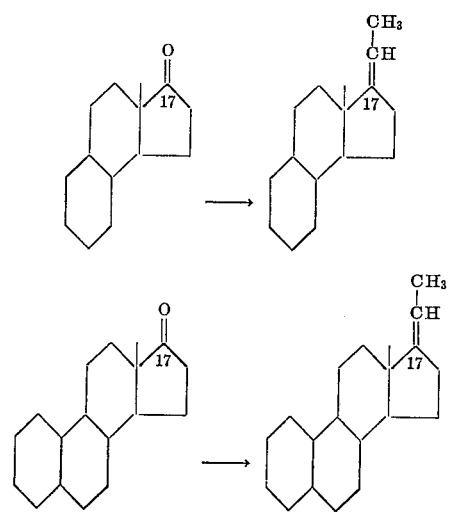

in the above skeletal formulas substituents and stereoconfigurations are not shown in the 1-, 2-, 3-, 4-, 5-, 6-, 7-, 8-, 9-, 10-, 11-, 12-, 14-, 15- and 16-positions.

The process of this invention can be effected with starting material 17-oxo-steroids of the androstane series or of the desA-androstane series; however, any oxo groups in other than the 17-position should be protected prior to the process of this invention. The presence of double bonds in the starting material 17-oxo-steroid or -des-A-steroid molecule, e.g., between $C_2$ and $C_3$, $C_6$ and $C_7$, etc., leads to attack thereof in subsequent reactions which are used to convert the 17-ethylidene moiety into a 17-acetyl moiety. This attack will, in certain instances, produce ring substituents and hence the use of starting materials containing an olefinic unsaturation constitutes one aspect of this invention and a separate and preferred aspect is to use as a starting material a nonolefinic, carbocyclic 17-oxo-steroid of the desA-androstane series or of the androstane series.

The term olefinic as used herein indicates a nonaromatic unsaturation between two carbon atoms. The term nonolefinic thus comprehends both fully saturated steroids and desA-steroids, as well as aromatically unsaturated steroids, for example, steroids having an aromatic A-ring.

The steroid or desA-steroid starting material can contain substituents found in pharmacologically active steroids such as lower alkyl, halo, hydroxy, ether groups such as lower alkoxy and tetrahydropyranyloxy, and the like, which substituents are not affected by the process of this invention. Thus, the starting material carbocyclic 17-oxo-steroid of the androstane or desA-androstane series can contain a number of substituents in the molecule without interfering with the process of this invention. For example, it can have lower alkyl groups, hydroxy groups, lower alkoxy groups, tetrahydropyranyloxy, halogen atoms, protected oxo moieties such as lower alkylenedioxy groups, etc., at positions 1, 2, 3, 4, 5, 6, 7, 8, 9, 10, 11, 12, 14, 15, 16, 18 and/or 19.

In one embodiment the present invention comprehends a process for the preparation of carbocyclic 17-ethylidenesteroids or 17-ethylidene-desA-steroids, which comprises reacting a carbocyclic 17-oxo-steroid or 17-oxo-desA- steroid, wherein all oxo groups in other than the 17-position are protected, with a compound of the formula

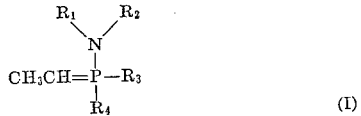
(I)

wherein each of $R_1$ and $R_2$ is independently lower alkyl or phenyl-lower alkyl or $R_1$ and $R_2$ taken together are oxa-lower alkylene or lower alkylene; and each of $R_3$ and $R_4$ is independently a moiety of the formula

phenyl or substituted phenyl.

As used herein the term "lower alkyl" refers to both straight and branched chain hydrocarbon moieties, such as methyl, ethyl, t-butyl, and the like. The term "oxa-lower alkylene" refers to moieties such as

—CH$_2$CH$_2$OCH$_2$CH$_2$— in which case $R_1$ and $R_2$, taken together with the nitrogen atom to which they are joined in Formula I, constitute morpholino. Similarly, the term "lower alkylene" encompasses polymethylene groupings such as tetramethylene and pentamethylene, in which case $R_1$ and $R_2$ taken together with the nitrogen atom form, respectively, pyrrolidino and piperidino. Substituted phenyl moieties encompassed by the symbols $R_3$ and $R_4$ in Formula I are, for example, phenyl moieties substituted by halo, such as chloro or bromo; lower alkoxy, such as methoxy; or di-lower alkylamino such as dimethylamino. Preferred compounds of Formula I are those wherein $R_3$ and $R_4$ are either an amino, imino or unsubstituted phenyl group. Of these compounds wherein $R_3$ and/or $R_4$ is substituted phenyl, parasubstituted phenyl moieties are preferred. Especially preferred compounds of Formula I are those of the formula

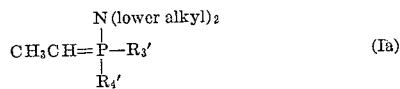
(Ia)

wherein each of $R_3'$ and $R_4'$ is independently N(lower alkyl)$_2$ or phenyl.

In the process of the present invention a compound of Formula I is reacted with a carbocyclic 17-oxo-steroid of the androstane series or a carbocyclic 17-oxo-desA-steroid of the androstane series, in either case all oxo groups in other than the 17-position being protected. This reaction is suitably effected in a neutral, nonketonic, aprotic, organic solvent. Organic solvents which can be used are, for example, ethers, e.g., lower alkyl ethers such as di-ethyl ether, dioxane, tetrahydrofuran or the like; aromatic hydrocarbons such as benzene, xylene, cumene or the like; di-lower alkyl lower alkanoylamides such as dimethylformamide, dimethylacetamide or the like; dimethylsulfoxide; etc.

The reaction of the compound of Formula I with the 17-oxo-steroid of the androstane or desA-androstane series is suitably conducted at a temperature between room temperature and about 150° C. or the boiling point of the reaction medium whichever is lower. It has been found that the preferable temperature range in which to conduct the reaction is between about 60° C. and about 110° C. Especially good results are obtained when the reaction is conducted between about 95° C. and about 105° C. and accordingly this is an especially preferred temperature range. The quantity of reactants used is not critical, and an excess of either can be used. However, it has been found advantageous to use a molar excess of the compound of Formula I, and especially preferable to use at least about 5 moles of the compound of Formula I for each mole of the 17-oxo compound being reacted. The compounds of Formula I can either be added to the reaction mixture as such or can be generated in situ from compounds of the formula

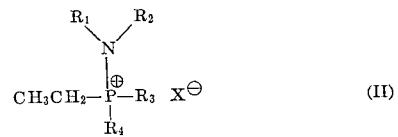
(II)

wherein $R_1$, $R_2$, $R_3$ and $R_4$ have the same meaning as above and X is an anion.

Suitably, the anion represented by X is an inorganic anion, for example, a halide such as chloride, bromide or iodide, or sulfate or the like. The compound of Formula I can be generated from the compound of Formula II, in situ if desired, via treatment of the compound of Formula II with an acid binding agent, for example, with a base such as an alkali metal-lower alkoxide such as sodium methoxide, alkali metal hydroxide such as sodium hydroxide, alkali metal hydride such as sodium hydride, alkali metal lower alkane such as t-butyl lithium, or the like.

As indicated above, oxo groups in other than the 17-position of the starting material 17-oxo compounds should be protected prior to the treatment thereof with a compound of Formula I. Such protection can be effected by known means. For example, the protecting group can be inserted and split off by means known per se. Alternatively, oxo groups present in other than the 17-position can be selectively reduced to hydroxy groups. When desired the oxo groups can then be regenerated by a conventional oxidation means, for example, via oxidation with chromium trioxide in an acidic solution such as glacial acetic acid. In one embodiment, oxo groups present in other than the 17-position can be protected by ketalization, i.e., by reaction with a lower alkanediol to yield a lower alkylenedioxy substituent, which subsequently can be removed by means known per se, for example, by mild acid hydrolysis, thereby yielding the desired oxo substituent. An alternate method of protecting oxo groups in other than the 17-position is to form enamines thereof, for example, the N-pyrrolidyl enamines thereof. After the reaction of a compound of Formula I with a 17-oxo compound, i.e., after effecting the process of this invention, by-products and impurities can be removed from the reaction mixture by an aqueous wash, for example, by washing with water or an aqueous acid solution, for example, an aqueous inorganic acid such as aqueous hydrochloric acid. This simple purification is a particular advantage of the process of this invention.

As indicated above, the reaction of this invention is useful both in the conversion of 17-oxo-steroids of the androstane series as well as in the conversion of 17-oxo-desA-steroids of the androstane series. Especially preferred starting materials are 17-oxo-perhydro-desA-steroids of the androstane series and 17-oxo-steroids of the androstane series containing either a fully saturated A-ring or an aromatic A-ring. Those containing an aromatic A-ring preferably have either a 3-lower alkoxy or 3-tetrahydropyranyloxy substituent, whereas those having a saturated A-ring preferably have either a 3-lower alkoxy, 3-tetrahydropyranyloxy, 3,3-lower alkylenedioxy, or 3-enamine substituent.

The process of the present invention is applicable to 17-oxo-steroid and 17-oxo-desA-steroid starting materials irrespective of the stereoconfiguration of the rings of the starting material. Thus, the process of the invention is applicable to starting material 17-oxo-steroids having the B/C/D-trans-anti-trans stereoconfiguration of natural steroids as well as those having the cis-anti-trans stereoconfiguration of, for example, 9β,10α-steroids. Similarly, the process of this invention is applicable to starting material 17-oxo-desA-steroids having, for example, either a 9β- or 9α-stereoconfiguration. Thus, for example, by the process of this invention 3β-hydroxy-5α-androstan-17-one (isoandrosterone) can be converted to 5α-pregn-17(20)-en-3β-ol, 3α-hydroxy-5β,9β,10α-androstan-17-one can be converted to 5β,9β,10α-pregn-17(20)-en-3α-ol, 9β,10α - androst-4-en-3,17-dione can be converted to 9β,10α-pregna-4,17(20)-diene-3-one, estrone methyl ether can be converted to 3 - methoxy-19-nor-pregna-1,3,5(10),17(20)-tetraene, desA-9β,10β-androstan-5,17-dione with appropriate protection of the 5-oxo group can be converted to desA-9β,10β-pregn-17(20)-en-5-one, and desA - 9α,10α-androstan-5,17-dione with appropriate protection of the 5-oxo group can be converted into desA-9α,10α-pregn-17(20)-en-5-one. In the aforesaid conversions the 5-oxo group of des-A-steroids and the 3-oxo group of steroids can be protected, for example, by ketalization to a 5,5-ethylenedioxy moiety or by formation of the N-pyrrolidinyl enamine.

As indicated above, the desA-pregn-17(20)-enes obtained by the process of this invention are useful as intermediates for the formation of the tetracyclic steroid nucleus. Thus, if the desA-pregn-17(20)-ene obtained by the method of this invention contains an oxo group in the 5-position or a group convertible to an oxo group thereat, the A-ring of the steroid nucleus can be formed by first converting the 17-ethylidene side chain into a 17β-(1-hydroxyethyl) or 17β-acetyl side chain, and then converting the so-formed desA-pregnan-20-ol-5-one or desA-pregna-5,20-dione, via condensation with methyl vinyl ketone according to methods known per se into a corresponding Δ⁴-pregnan-20-ol-3-one or Δ⁴-pregnane-3,20-dione. The conversion of the 17-ethylidene side chain into a 17β-(1-hydroxyethyl) side chain can be effected, for example, by reacting the 17-ethylidene compound with diborane in tetrahydrofuran (generated by employing a 1 N BH₃-tetrahydrofuran complex) and then hydrogen peroxide. Subsequent oxidation with, for example, chromium trioxide, converts the 17-(1-hydroxyethyl) compound into a 17β-acetyl compound.

The following examples are illustrative, but not limitative of this invention. All temperatures are in degrees centigrade.

Example 1

Seventy-five ml. of ethyl iodide was added over 45 min., while stirring under a nitrogen atmosphere, to 38.5 g. of tris(dimethylamino)phosphine. Spontaneous heating occurred after about half of the addition, and thereafter the mixture was cooled in an ice bath. After the addition was completed, the viscous suspension was stirred for an additional hour, diluted with ethyl acetate and filtered. The residue was washed well with ethyl acetate and dried yielding ethyl-tris(dimethylamino)-phosphonium iodide.

Sodium hydride (336 mg.) 54% dispersion was washed 3 times with petroleum ether, and blown dry with nitrogen. Seven ml. of dimethylsulfoxide was then added and the mixture stirred at 70–75° under a nitrogen atmosphere for 45 min. The so-obtained light green solution was cooled to room temperature, and 2.6 g. of ethyl-tris-(dimethylamino)-phosphonium iodide in 15 ml. of dimethylsulfoxide then rapidly added, followed by a solution of 500 mg. of estrone methyl ether in 15 ml. of benzene. After heating at 105° overnight, the reaction mixture was cooled, poured into ice-water and extracted with petroleum ether. The organic extract was washed with ether, dried with sodium sulfate and evaporated. The crude product was purified on a column of alumina and the presence of both cis and trans 3-methoxy-19-nor-pregna-1,3,5(10),17(20)-tetraene was demonstrated by vapor phase chromatography.

Example 2

Fifty ml. of ethyl iodide was added over 30 minutes, with stirring under a nitrogen atmosphere, to a solution of 27 g. of bis-(diethylamino)phenylphosphine in 50 ml. of ethyl acetate. After stirring for 4 hrs. at 25°, the precipitate was filtered, washed well with ethyl acetate and dried yielding ethyl-bis(diethylamino)phenylphosphonium iodide.

Example 3

Forty ml. of ethyl iodide was added over 15 minutes, with stirring under a nitrogen atmosphere, to a solution of 22 g. of diethylaminodiphenylphosphine in 30 ml. of ethyl acetate. The mixture was refluxed for 3 hrs., cooled and the precipitate was filtered, washed well with ethyl acetate and dried yielding ethyl(diethylamino)diphenylphosphonium iodide.

Example 4

A 54% dispersion of sodium hydride (336 mg.) was washed 3 times with petroleum ether and blown dry with nitrogen. Seven ml. of dimethylsulfoxide was added and the mixture then stirred under a nitrogen atmosphere at 70–75° for 45 minutes. The resultant green solution was cooled at 25° and a solution of 3.33 g. of ethyl-bis(diethylamino)phenylphosphonium iodide in 15 ml. of dimethylsulfoxide rapidly added, followed by the addition of a solution of 500 mg. of 5,5-ethylenedioxy-9β,10β-desA-androstan-17-one in 15 ml. of dimethylsulfoxide. After heating under a nitrogen atmosphere at 85° for 18 hrs., the reaction mixture was cooled, poured into water, and the product extracted with petroleum ether. Purification was effected on a column of alumina, yielding as crude product a mixture containing both cis-and trans-5,5-ethylenedioxy-9β,10β-desA-17(20)-pregnene.

Example 5

A solution of 336 mg. of sodium hydride (54% dispersion) in 7 ml. of dimethylsulfoxide was prepared as in Example 5. After cooling to 25°, a solution of 3.37 g. of ethyldiethylamino-diphenylphosphonium iodide in 15 ml. of dimethylsulfoxide was added, followed by the addition of a solution of 600 mg. of 3-(N-pyrrolidinyl)-9β,10α-androsta-3,5-diene-17-one in 15 ml. of benzene. The reaction mixture was stirred under a nitrogen atmosphere at 65° for 18 hrs., treated with 10 ml. of methanol and 5 ml. of 5% NaOH solution, and heated at 50° for 1 hr. After neutralization of the reaction mixture with acetic acid, the product was extracted with ether. Purification was effected on a column of silica gel yielding a crude mixture containing both cis- and trans-9β,10α-pregna-4,17(20)-diene-3-one.

We claim:

1. A process for the preparation of carbocyclic 17-ethylidene steroids or 17-ethylidene-desA-steroids, comprising reacting in a neutral, nonketonic, aprotic, organic solvent, a starting material carbocyclic 17-oxo-steroid or 17-oxo-desA-steroid, wherein all oxo groups in other than the 17-position are protected, with a phosphorus compound of the formula

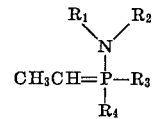

wherein each of $R_1$ and $R_2$ is independently lower alkyl or phenyl-lower alkyl or $R_1$ and $R_2$ taken together are oxa-lower alkylene or lower alkylene; and each of $R_3$ and $R_4$ is independently a moiety of the formula

phenyl or substituted phenyl.

2. A process as in claim 1, wherein the phosphorus compound is of the formula

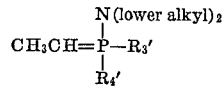

wherein each of $R_3'$ and $R_4'$ is independently N(lower alkyl)$_2$ or phenyl.

3. A process as in claim 1, wherein the phosphorus compound is ethylidene-tris(dimethylamino)-phosphorane.

4. A process as in claim 1, wherein the phosphorus compound is ethylidene-bis(diethylamino)-phenylphosphorane.

5. A process as in claim 1, wherein the phosphorus compound is ethylidene-(diethylamino)-diphenylphosphorane.

6. A process as in claim 1, wherein the starting material is a carbocyclic, B/C/D-trans-anti-trans androstan-17-one, wherein all oxo groups in other than the 17-position are protected.

7. A process as in claim 1, wherein the starting material is a carbocyclic, B/C/D-trans-anti-trans estra-1,3,5(10)-trien-17-one, wherein all oxo groups in other than the 17-position are protected.

8. A process as in claim 1, wherein the starting material is a carbocyclic, B/C/D-cis-anti-trans androstan-17-one, wherein all oxo groups in other than the 17-position are protected.

9. A process as in claim 1, wherein the starting material is a carbocyclic B/C/D-cis-anti-trans desA-androstan-17-one, wherein all oxo groups in other than the 17-position are protected.

10. A process as in claim 2, wherein the starting material is 9β,10α-desA-androstan-17-one having a protected oxo group in the 5-position.

11. A process as in claim 2, wherein the starting material is estrone lower alkyl ether.

12. A process as in claim 2, wherein the starting material is a 9β,10α-androstan-17-one having a protected oxo group in the 3-position.

13. The process as in claim 1, wherein the solvent is dimethylsulfoxide.

14. The process as in claim 1 wherein the solvent is tetrahydrofuran.

15. The process as in claim 1 wherein the reaction is conducted at a temperature of between 95° C. and 105° C.

References Cited

UNITED STATES PATENTS 3,301,880   1/1967   Van Vliet _____ 260—397.5

OTHER REFERENCES

Scondheimer et al., J. Amer. Soc. 79, 5029–5033 (1957).

Wittig et al., Ber. Deut. Chem. Ges., 94, 676–689 (1961), pp. 682, 683, 687, 688, and 689 relied on.

LEWIS GOTTS, *Primary Examiner.*

E. G. LOVE, *Assistant Examiner.*